US011792816B2

(12) United States Patent
Zhu

(10) Patent No.: US 11,792,816 B2
(45) Date of Patent: Oct. 17, 2023

(54) DATA TRANSMISSION METHOD AND DEVICE AND COMPUTER-READABLE STORAGE MEDIUM

(71) Applicant: Beijing Xiaomi Mobile Software Co., Ltd., Beijing (CN)

(72) Inventor: Yajun Zhu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 118 days.

(21) Appl. No.: 17/490,584

(22) Filed: Sep. 30, 2021

(65) Prior Publication Data

US 2022/0022243 A1 Jan. 20, 2022

Related U.S. Application Data

(63) Continuation of application No. 16/752,290, filed on Jan. 24, 2020, now Pat. No. 11,166,306, which is a
(Continued)

(51) Int. Cl.
*H04L 5/00* (2006.01)
*H04W 72/23* (2023.01)

(52) U.S. Cl.
CPC .................. *H04W 72/23* (2023.01)

(58) Field of Classification Search
CPC ............. H04L 5/0007; H04L 1/1861; H04L 5/0053; H04L 5/0092; H04L 1/1825;
(Continued)

(56) References Cited

U.S. PATENT DOCUMENTS 11,160,057 B2 * 10/2021 Lin .................. H04B 7/0456
2011/0070845 A1 3/2011 Chen et al.
(Continued)

FOREIGN PATENT DOCUMENTS

CN 105722229 A 6/2016
CN 106162889 A 11/2016
(Continued)

OTHER PUBLICATIONS

International Search Report and Written Opinion of PCT Application No. PCT/CN2017/096012 dated May 2, 2018.
(Continued)

*Primary Examiner* — David Q Nguyen
(74) *Attorney, Agent, or Firm* — Finnegan, Henderson, Farabow, Garrett & Dunner, L.L.P.

(57) ABSTRACT

A data transmission method includes: receiving scheduling signaling sent by a base station on a target bandwidth part, wherein the scheduling signaling carries frequency-domain resource indication information and parameter indication information, and the target bandwidth part is a bandwidth part capable of transmitting the scheduling signaling in a plurality of bandwidth parts; upon determining, based on the frequency-domain resource indication information and pre-stored configuration information, that the target bandwidth part is not a to-be-scheduled bandwidth part, determining the to-be-scheduled bandwidth part from the plurality of bandwidth parts based on the frequency-domain resource indication information and the configuration information; and transmitting data through the to-be-scheduled bandwidth part according to a configuration parameter associated with the parameter indication information.

16 Claims, 5 Drawing Sheets

Related U.S. Application Data continuation of application No. PCT/CN2017/096012, filed on Aug. 4, 2017.

(58) Field of Classification Search
CPC ............ H04L 1/1812; H04L 27/26025; H04L 5/0012; H04L 2001/125; H04L 5/0055; H04L 5/0044; H04L 5/0094; H04L 5/0048; H04W 72/1263
USPC ................................. 370/328, 329, 330, 331
See application file for complete search history.

(56) References Cited

U.S. PATENT DOCUMENTS

| | | | |
|---|---|---|---|
| 2012/0076028 | A1 | 3/2012 | Ko et al. |
| 2015/0341915 | A1 | 11/2015 | Lyu et al. |
| 2018/0139778 | A1 | 5/2018 | Chou et al. |
| 2018/0206267 | A1 | 7/2018 | Islam et al. |
| 2018/0279353 | A1 | 9/2018 | Shaheen et al. |
| 2018/0343683 | A1 | 11/2018 | Shao et al. |
| 2019/0021045 | A1 * | 1/2019 | Kim ...................... H04W 72/23 |
| 2019/0029003 | A1 | 1/2019 | Takeda et al. |
| 2020/0077432 | A1 | 3/2020 | Xiong et al. |
| 2020/0128621 | A1 | 4/2020 | Chang et al. |
| 2021/0075581 | A1 | 3/2021 | Takeda et al. |

FOREIGN PATENT DOCUMENTS

| | | | |
|---|---|---|---|
| CN | 106301733 A | 1/2017 | |
| CN | 106612547 A | 5/2017 | |
| CN | 106658742 A | 5/2017 | |
| CN | 106714322 A | 5/2017 | |
| CN | 106937381 A | 7/2017 | |
| EP | 3557938 B1 * | 7/2021 | .......... H04W 68/005 |
| IN | 2678KOLN P2015 A | 7/2016 | |
| JP | 2013-504942 | 2/2013 | |
| RU | 2619066 C1 | 5/2017 | |
| WO | WO 2011116680 A1 | 9/2011 | |
| WO | WO 2014121489 A1 | 8/2014 | |
| WO | WO 2015103763 A1 | 7/2015 | |
| WO | WO 2016/070417 A1 | 5/2016 | |
| WO | WO 2017/122751 A1 | 7/2017 | |
| WO | WO 2018/232284 A1 | 12/2018 | |
| WO | WO-2018231971 A1 * | 12/2018 | .......... H04L 1/1812 |
| WO | WO-2018232284 A1 * | 12/2018 | .......... H04W 72/042 |

OTHER PUBLICATIONS

First Office Action of Chinese Application No. 201780000764.2 dated Jul. 15, 2019.
Extended European Search Report in the European Application No. 17920436.7 dated Jun. 9, 2020.
Vivo, "Discussion on NR resource allocation", R1-1707238, 3GPP TSG RAN WG1 Meeting #88bis, Hangzhou, P.R. China, May 15-19, 2017, 4 pgs.
Guangdong OPPO Mobile Telecom, "Bandwidth part based resource scheduling for carrier aggregation", R2-1710171, 3GPP TSG RAN WG1 NR Ad-Hoc#2, Qingdao, P.R. China, Jun. 27-30, 2017, 3 pgs.
Guangdong OPPO Mobile Telecom, "Bandwidth part configuration and frequency resource allocation", R1-1710164, 3GPP TSG RAN WG1 NR Ad-Hoc#2, Qingdao, P.R. China, Jun. 27-30, 2017, 6 pgs.
Samsung, RAN2 consideration for bandwidth part in NR, R2-1706427 (update of R2-1704503), 3GPP TSG-RAN WG2 NR Ad-hoc#2 Meeting, Qingdao, China, Jun. 27-29, 2017, 5 pgs.
Acceptance Decision of Russian Application No. 2020107006 issued on Jul. 21, 2020.
Notice of Reasons for Refusal dated Feb. 26, 2021, from Japanese Patent Office in counterpart Japanese Application No. 2020-505843.
Office Action dated Jun. 25, 2021, from India Patent Office in counterpart Indian Application No. 202027008000.
Notification of Reasons for Refusal dated Jul. 26, 2021, from Korean Intellectual Property Office in counterpart Korean Application No. 10-2020-7005667.
Notice of Reasons for Refusal dated Sep. 8, 2021, from Japanese Patent Office in counterpart Japanese Application No. 2020-505843.
Intel Corporation, Open issues for wider bandwidth operations, 3GPP TSG RAN WG1 NR Ad-Hoc#2, R1-1710583. Qingdao, P.R. China, Jun. 27-30, 2017, 7 pages.

* cited by examiner

FIG. 1A

```
┌─────────────────────────────────────────────────────────┐
│  Receiving scheduling signaling sent by a base station on a target
│  bandwidth part, wherein the scheduling signaling carries frequency-
│  domain resource indication information and parameter indication
│  information, and the target bandwidth part is a bandwidth part     ─101
│  capable of transmitting the scheduling signaling in a plurality of
│  configured bandwidth portions
└─────────────────────────────────────────────────────────┘
                              ↓
┌─────────────────────────────────────────────────────────┐
│  Determining a to-be-scheduled bandwidth part from the plurality of
│  bandwidth parts based on the frequency-domain resource indication
│  information and the configuration information, upon determining,   102
│  based on the frequency-domain resource indication information and
│  pre-stored configuration information, that the target bandwidth part is
│  not a to-be-scheduled bandwidth part
└─────────────────────────────────────────────────────────┘
                              ↓                              103
┌─────────────────────────────────────────────────────────┐
│  Transmitting data through the to-be-scheduled bandwidth part
│  according to a configuration parameter associated with the parameter
│  indication information
└─────────────────────────────────────────────────────────┘
```

FIG. 1B

DATA TRANSMISSION METHOD AND DEVICE AND COMPUTER-READABLE STORAGE MEDIUM

CROSS-REFERENCE TO RELATED APPLICATIONS

This application is a continuation application of U.S. application Ser. No. 16/752,290, filed on Jan. 24, 2020, which is a continuation application of International Application No. PCT/CN2017/096012, filed on Aug. 4, 2017, the entire contents of both of which are incorporated herein by reference.

TECHNICAL FIELD

The present disclosure relates to the field of communication technologies, and in particular, to a data transmission method and device and a computer-readable storage medium.

BACKGROUND

A current communication system usually needs to support a plurality of service types. However, different service types may have different requirements on the wireless communication technology. For example, the enhanced mobile broadband (eMBB) service type mainly focuses on large bandwidth, high rates and the like the ultra-reliable low latency communication (URLLC) service type mainly focuses on relatively higher reliability and low latency; and the massive machine type communication (mMTC) service type mainly focuses on the large connection number. Therefore, in order to meet user's service demands and different performance requirements of different services, when transmitting the plurality of service types, the communication system needs to have flexible and configurable design to support efficient transmission of the plurality of service types.

In the relevant art, in order to support flexible configuration of the plurality of service types, a terminal may be configured with a plurality of carriers, which use the same numerology (a basic configuration parameter for air interface transmission). For example, for the design based on orthogonal frequency division multiplexing (OFDM), sub-carrier spacing, symbol lengths, cyclic prefix (CP) lengths, and the like which are used on the plurality of carriers are the same. As the technology evolves, further, a plurality of bandwidth parts may be configured on one carrier, wherein the bandwidth part refers to a frequency-domain resource on the carrier. When data is transmitted, the carrier or the bandwidth part on the carrier may be scheduled, and then the data is transmitted based on the corresponding numerology.

SUMMARY

In a first aspect, there is provided a data transmission method, comprising: receiving scheduling signaling sent by a base station on a target bandwidth part, wherein the scheduling signaling carries frequency-domain resource indication information and parameter indication information, and the target bandwidth part is a bandwidth part capable of transmitting the scheduling signaling in a plurality of bandwidth parts; upon determining, based on the frequency-domain resource indication information and pre-stored configuration information, that the target bandwidth part is not a to-be-scheduled bandwidth part, determining the to-be-scheduled bandwidth part from the plurality of bandwidth parts based on the frequency-domain resource indication information and the configuration information; and transmitting data through the to-be-scheduled bandwidth part according to a configuration parameter associated with the parameter indication information.

In a second aspect, there is provided a data transmission device, comprising: a processor; and a memory for storing instructions executable by the processor, wherein the processor is configured to: receive scheduling signaling sent by a base station on a target bandwidth part, wherein the scheduling signaling carries frequency-domain resource indication information and parameter indication information, and the target bandwidth part is a bandwidth part capable of transmitting the scheduling signaling in a plurality of bandwidth parts; upon determining, based on the frequency-domain resource indication information and pre-stored configuration information, that the target bandwidth part is not a to-be-scheduled bandwidth part, determine the to-be-scheduled bandwidth part from the plurality of bandwidth parts based on the frequency-domain resource indication information and the configuration information; and transmit data through the to-be-scheduled bandwidth part according to a configuration parameter associated with the parameter indication information.

In a third aspect, there is provided a computer-readable storage medium having stored thereon instructions that, when executed by a processor of a device, cause the device to perform a data transmission method, the method comprising: receiving scheduling signaling sent by a base station on a target bandwidth part, wherein the scheduling signaling carries frequency-domain resource indication information and parameter indication information, and the target bandwidth part is a bandwidth part capable of transmitting the scheduling signaling in a plurality of bandwidth parts; upon determining, based on the frequency-domain resource indication information and pre-stored configuration information, that the target bandwidth part is not a to-be-scheduled bandwidth part, determining the to-be-scheduled bandwidth part from the plurality of bandwidth parts based on the frequency-domain resource indication information and the configuration information; and transmitting data through the to-be-scheduled bandwidth part according to a configuration parameter associated with the parameter indication information.

The technical solutions provided in embodiments of the present disclosure may include the following beneficial effects.

In the embodiments of the present disclosure, in order to achieve multiplexing of a plurality of service types, the terminal flexibly supports cross-bandwidth part scheduling for data transmission. Since in the plurality of bandwidth parts, some bandwidth parts can transmit control information and some bandwidth parts cannot transmit control information, the terminal receives the scheduling signaling sent by the base station on the target bandwidth part, wherein the scheduling signaling carries the frequency-domain resource indication information and the parameter indication information; and determines whether the target bandwidth part is the to-be-scheduled bandwidth part based on the frequency-domain resource indication information and the pre-stored configuration information. When the target bandwidth part is not the to-be-scheduled bandwidth part, the terminal may determine the to-be-scheduled bandwidth part from the plurality of bandwidth parts based on the frequency-domain resource indication information and the configuration information, and then transmits data through the to-be-scheduled bandwidth part based on the configuration parameter associated with the parameter indication information. Thus, the other bandwidth parts are scheduled through the scheduling signaling transmitted on the target bandwidth part, thereby achieving cross-bandwidth part scheduling.

It is to be understood that both the foregoing general description and the following detailed description are exemplary and explanatory only and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 1A is a schematic diagram of a system architecture according to one exemplary, embodiment.

FIG. 1B is a flow chart of a data transmission method according to one exemplary embodiment.

DETAILED DESCRIPTION

Figure 2A:
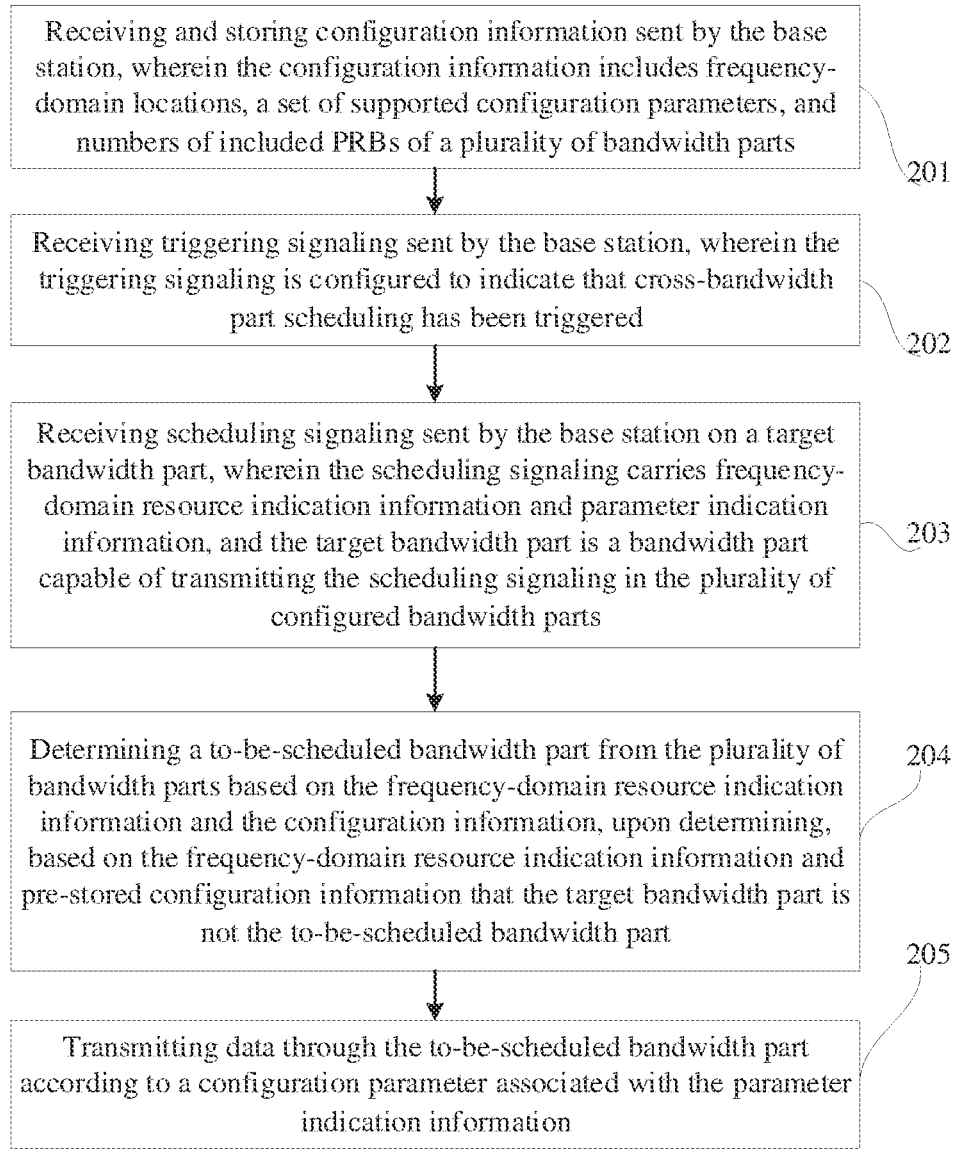
FIG. 2A is a flow chart of a data transmission method according to another exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the disclosure as recited in the appended claims.

In embodiments of the present disclosure, parameter indication information is indication information carried in scheduling signaling sent to a terminal by a base station, and may be a configuration parameter or a scrambling sequence for indicating the configuration parameter. The configuration parameter and the scrambling sequence are for purpose of determining the configuration parameter on the bandwidth part. The configuration parameter may be numerology.

In embodiments of the present disclosure, a bandwidth part is a frequency-domain resource on a carrier, wherein the carrier may contain a plurality of different frequency-domain resources, i.e., a plurality of different bandwidth parts.

At present, as new Internet applications, such as augmented reality (AR)/virtual reality (VR) emerge one after another, the wireless communication technology is rapidly developed and evolved to meet application demands. In a practical application scenario, different service types have different demands on the wireless communication technology. One of important characteristics of the new-generation communication technology is to support flexible configuration of a plurality of service types. As described in the Background, in the relevant art, when the terminal is configured with a plurality of carriers or one carrier is configured with a plurality of bandwidth parts, different carriers or bandwidth parts use the same configuration parameter. However, when the traffic and the service requirements increase, it is often necessary to use different configuration parameters on different carriers or bandwidth parts for data transmission. Therefore, when different configuration parameters are used on different carriers or bandwidth parts for data transmission, how to flexibly support cross-carrier or cross-bandwidth part, scheduling by the terminal to transmit data becomes a research hotspot.

Embodiments of the present disclosure provide a data transmission method. This data transmission method solves the problem about how to flexibly support cross-bandwidth part scheduling by the terminal.

FIG. 1A is a diagram of a system architecture according to one exemplary embodiment. As shown in FIG. 1A, the system architecture may include a terminal 110 and a base station 120. The terminal 110 may access the base station 120 through a wireless communication network.

The base station 120 is configured to send configuration information, triggering signaling and scheduling signaling to the terminal 110. The configuration information may include frequency-domain locations, a set of supported configuration parameters, and numbers of included physical resource blocks (PRBs) of a plurality of bandwidth parts. The triggering signaling is configured to indicate that cross-bandwidth part scheduling has been triggered. The scheduling signaling is configured to notify the terminal 110 to perform cross-bandwidth part scheduling.

The terminal 110 is configured to implement the data transmission method provided in the embodiment of the present disclosure. For example, the terminal 110 is configured to receive and store the configuration information sent by the base station 120. Here, the configuration information that is sent to the terminal 110 by the base station 120 is illustrated as an example. In another embodiment, the configuration information may also be predefined, which is not limited in the embodiment of the present disclosure. In addition, the terminal 110 is further configured to receive the triggering signaling sent by the base station 120 so as to trigger cross-bandwidth part scheduling.

Further, when receiving the scheduling signaling sent by base station 120, the terminal 110 determines, according to frequency-domain resource indication information carried in the scheduling signaling and pre-stored configuration information, a to-be-scheduled bandwidth part, which is indicated by the base station 120, from the plurality of bandwidth parts after determining that a target bandwidth part is not the to-be-scheduled bandwidth part. Further, the terminal 110 transmits data through the to-be-scheduled bandwidth part based on a configuration parameter associated with parameter indication information carried in the scheduling signaling. An exemplary implementation process of the terminal will be described below in FIGS. 1B and 2A.

It should be noted that the terminal 110 may be any device capable of performing wireless communication. For example, the terminal 110 may be a mobile phone or the like, which is not limited in the embodiment of the present disclosure.

FIG. 1B is a flow chart of a data transmission method according to one exemplary embodiment. As shown in FIG. 1B, this method is applied to a terminal and includes the following steps.

In step 101, scheduling signaling sent by a base station on a target bandwidth part is received, wherein the scheduling signaling carries frequency-domain resource indication information and parameter indication information, and the target bandwidth part is a bandwidth part capable of transmitting the scheduling signaling in a plurality of configured bandwidth parts.

In step 102, upon determining, based on the frequency-domain resource indication information and pre-stored configuration information, that the target bandwidth part is not a to-be-scheduled bandwidth part, the to-be-scheduled bandwidth part is determined from the plurality of bandwidth parts based on the frequency-domain resource indication information and the configuration information.

In step 103, data is transmitted through the to-be-scheduled bandwidth part according to a configuration parameter associated with the parameter indication information.

In the embodiment, in order to achieve multiplexing of a plurality of service types, the terminal may flexibly support cross-bandwidth part scheduling for data transmission. Since in the plurality of bandwidth parts, some bandwidth parts can transmit control information and some bandwidth parts cannot transmit control information, the terminal receives the scheduling signaling sent by the base station on the target bandwidth part, wherein the scheduling signaling carries the frequency-domain resource indication information and the parameter indication information; and determines, based on the frequency-domain resource indication information and the pre-stored configuration information, whether the target bandwidth part is the to-be-scheduled bandwidth part. When the target bandwidth part is not the to-be-scheduled bandwidth part, the terminal may determine the to-be-scheduled bandwidth part from the plurality of bandwidth parts based on the frequency-domain resource indication information and the configuration information and then transmit data through the to-be-scheduled bandwidth part based on the configuration parameter associated with the parameter indication information. Thus, other bandwidth parts are scheduled through the scheduling signaling transmitted on the target bandwidth part, thereby achieving cross-bandwidth part scheduling.

In an embodiment, the parameter indication information includes a configuration parameter or a scrambling sequence for indicating the configuration parameter.

In an embodiment, the step that data is transmitted through the to-be-scheduled bandwidth part according to a configuration parameter associated with the parameter indication information includes: when the parameter indication information is the scrambling sequence, a corresponding configuration parameter is acquired from a pre-stored correspondence between scrambling sequences and configuration parameters based on the scrambling sequence; and data is transmitted through the to-be-scheduled bandwidth part according to the acquired configuration parameter.

In an embodiment, the frequency-domain resource indication information includes indication information of a frequency-domain transmission unit, and the frequency-domain transmission unit includes one or more PRBs.

In an embodiment, the scheduling signaling is sent by downlink control information (DCI). The DCI includes a first information field for storing the indication information of the frequency-domain transmission unit. When the parameter indication information is the configuration parameter, the DCI further includes a second information field for storing the configuration parameter.

In an embodiment, the second information field is in a first preset location in the DCI, and the second information field has a first preset length.

In an embodiment, the scheduling signaling is sent by DCI. The DCI includes a first information field for storing the indication information of the frequency-domain transmission unit. When the parameter indication information is the scrambling sequence for indicating the configuration parameter, the scrambling sequence is carried on the DCI by scrambling.

In an embodiment, the frequency-domain resource indication information further includes bandwidth number indication information.

In an embodiment, the scheduling signaling is sent by downlink control information (DCI). The DCI includes a first information field for storing the indication information of the frequency-domain transmission unit and a third information field for storing the bandwidth number indication information. When the parameter indication information is the configuration parameter, the DCI further includes a second information field for storing the parameter indication information.

In an embodiment, the second information field is in a first preset location in the DCI, and the third information field is in a second preset location in the DCI. The second information field has a first preset length, and the third information field has a second preset length.

In an embodiment, the scheduling signaling is sent by DCI. The DCI includes a first information field for storing the indication information of the frequency-domain transmission unit and a third information field for storing the bandwidth number indication information. When the parameter indication information is the scrambling sequence for indicating the configuration parameter, the scrambling sequence is carried on the DCI by scrambling.

In an embodiment, the method further includes the following step before receiving scheduling signaling sent by a base station: the configuration information sent by the base station is received and stored, wherein the configuration information includes frequency-domain locations, a set of supported configuration parameters, and numbers of included PRBs of the plurality of bandwidth parts.

In an embodiment, the configuration information further includes bandwidth numbers of the plurality of bandwidth parts.

In an embodiment, the method further includes the following step before receiving scheduling signaling sent by a base station: triggering signaling sent by the base station is received, wherein the triggering signaling is configured to indicate that cross-bandwidth part scheduling has been triggered.

The above embodiments may be combined according to actual need.

FIG. 2A is a flow chart of a data transmission method according to one exemplary embodiment. As shown in FIG. 2A, this data transmission method may be applied to the system architecture shown in FIG. 1A and may include the following steps.

In step 201, configuration information sent by the base station is received and stored, wherein the configuration information includes frequency-domain locations, a set of supported configuration parameters, and numbers of included PRBs of a plurality of bandwidth parts.

In the embodiment, the base station may send the configuration information to the terminal. Correspondingly, after receiving the configuration information, the terminal may locally store the configuration information, so that the terminal may subsequently schedule bandwidth parts based on the configuration information, as described below.

It should be noted that the configuration information may be sent to the terminal by the base station through system information, high-layer signaling or physical-layer signaling. The high-layer signaling may include radio resource control (RRC) signaling, media access control (MAC) signaling and the like. The configuration information may also be sent in other modes.

Since the configuration information may include the frequency-domain locations, the set of supported configuration parameters, and the numbers of included PRBs of the plurality, of bandwidth parts and is configured to configure the plurality of bandwidth parts on a carrier, the terminal may store the configuration information when receiving the configuration information. At this time, it may be considered that the plurality of bandwidth parts has been configured.

It should be noted that the plurality of bandwidth parts may be bandwidth parts on the same carrier or on different carriers. That is, during subsequent scheduling, cross-bandwidth part scheduling may be performed through the bandwidth parts on the same carrier, or through the bandwidth parts on different carriers. In addition, the plurality of bandwidth parts may be continuous or discontinuous in the frequency domain.

The PRBs of the plurality of bandwidth parts may be numbered sequentially, that is, the numbers of the PRBs of the plurality of bandwidth parts are different from one another. For example, bandwidth part 1 includes three PRBs which are numbered 1, 2, and 3 respectively; bandwidth part 2 includes two PRBs which are numbered 4 and 5 respectively; bandwidth part 3 includes two PRBs which are numbered 6 and 7 respectively; and bandwidth part 4 includes three PRBs which are numbered 8, 9, and 10 respectively. In this case, the terminal may clearly distinguish different bandwidth parts through the numbers of the PRBs and thus implements cross-bandwidth scheduling. In some embodiments, the PRBs of the plurality of bandwidth parts may be numbered non-sequentially. At this time, the PRBs of the plurality of bandwidth parts may have the same numbers. For example, bandwidth part 1 includes three PRBs which are numbered 1, 2, and 3 respectively; bandwidth part 2 includes two PRBs which are numbered 1 and 2 respectively; bandwidth part 3 includes two PRBs which are numbered 1 and 3 respectively; and bandwidth part 4 includes three PRBs which are numbered 1, 3, and 4 respectively. At this time, the terminal may not distinguish different bandwidth parts through the numbers of the PRBs. Therefore, in this case, the configuration information that is sent to the terminal by the base station may further include bandwidth numbers of the plurality of bandwidth parts, so that the terminal may distinguish different bandwidth parts based on the numbers of the PRBs and the bandwidth numbers.

In some embodiments, the configuration information sent by the base station may further include scheduling indication information of the plurality of bandwidth parts, wherein the scheduling indication information is configured to indicate that in the plurality of bandwidth parts, which bandwidth parts can transmit control information, and which bandwidth parts cannot transmit control information. As such, for the bandwidth parts which can transmit the control information, the control information may be transmitted on these bandwidth parts and these bandwidth parts may also be scheduled for transmitting data; and for the bandwidth parts which cannot transmit the control information, these bandwidth parts may only be scheduled through scheduling signaling received on other bandwidth parts which can transmit the control information so as to transmit data. This is cross-bandwidth part scheduling.

Figure 2B:
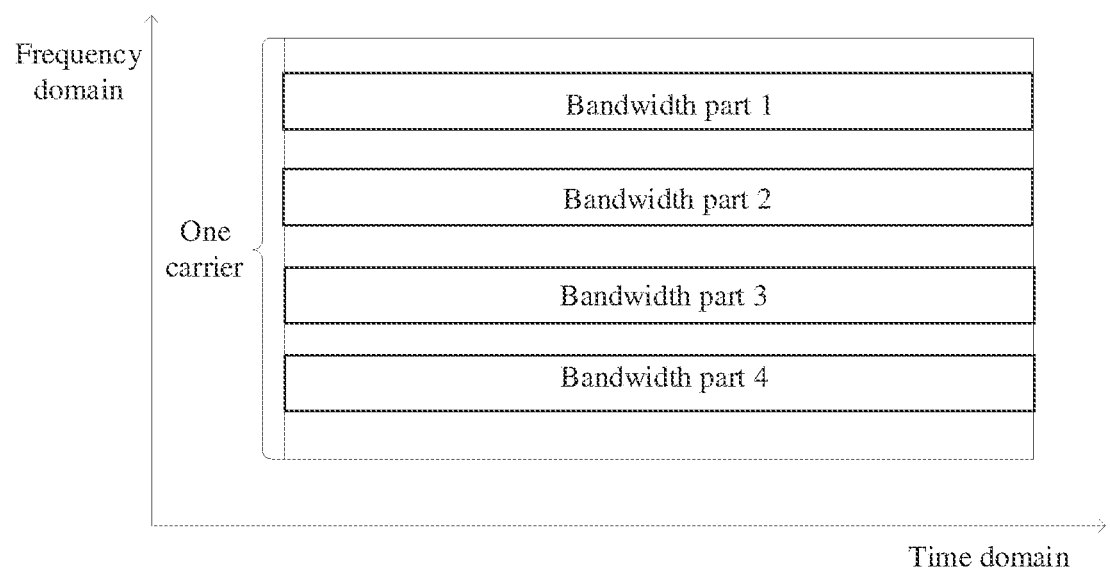
FIG. 2B is a schematic diagram of four bandwidth parts configured on a terminal according to one exemplary embodiment.

For example, as shown in FIG. 2B, four bandwidth parts are configured on one carrier and are bandwidth part 1, bandwidth part 2, bandwidth part 3 and bandwidth part 4 respectively. It may be determined, through the scheduling indication information in the configuration information, that bandwidth part 1 and bandwidth part 3 can transmit control information, and bandwidth part 2 and bandwidth part 4 cannot transmit control information. As such, bandwidth part 2 and bandwidth part 4 may be scheduled through the control information transmitted on bandwidth part 1 or bandwidth part 3 so as to transmit data.

It should be noted that in the embodiment of the present disclosure, the configuration information that is sent to the terminal by the base station is only illustrated as an example. The configuration information may also be predefined, which is not limited in the embodiment of the present disclosure.

After the plurality of bandwidth parts are configured through step 201 above, when the bandwidth parts are scheduled, the cross-bandwidth part scheduling may be trigged through step 202 below.

In step 202, triggering signaling sent by the base station is received, wherein the triggering signaling is configured to indicate that cross-bandwidth part scheduling has been triggered.

The terminal may need to perform cross-bandwidth scheduling, such as in a case where the service amount increases. In different cases, the time when the terminal performs cross-bandwidth scheduling may be different. Therefore, when cross-bandwidth part scheduling is needed, the base station may send the triggering signaling to the terminal so as to notify the terminal to perform cross-bandwidth part scheduling. The triggering signaling is configured to indicate that the cross-bandwidth part scheduling has been triggered.

It should be noted that the triggering signaling may be sent through RRC signaling, system information, MAC signaling, or physical layer signaling.

In some embodiments, step 202 may not need to be performed. After the plurality of bandwidth parts is configured, the cross-bandwidth part scheduling may be triggered directly. At this time, the cross-bandwidth part scheduling may be performed without step 202 above.

In step 203, scheduling signaling sent by the base station on a target bandwidth part is received, wherein the scheduling signaling carries frequency-domain resource indication information and parameter indication information, and the target bandwidth part is a bandwidth part capable of transmit the scheduling signaling in the plurality of configured bandwidth parts.

As described above, both the terminal and the base station may accurately acquire the frequency-domain locations, the set of supported configuration parameters, and the numbers of included PRBs of the plurality of bandwidth parts based on the configuration information. When needing to schedule bandwidth parts, the base station may determine the target bandwidth part, which can transmit control information, from the plurality of bandwidth parts. At this time, the scheduling signaling may be sent on the target bandwidth part.

It should be noted that the frequency-domain resource indication information includes indication information of a frequency-domain transmission unit. The frequency-domain transmission unit is a basic unit, on a frequency-domain, for transmitting information and includes one or more PRBs. The indication information of the frequency-domain transmission unit may be configured to indicate numbers of one or more PRBs. Further, in the case where the PRBs of the plurality of bandwidth parts have the same numbers, the frequency-domain resource indication information may further include bandwidth number indication information for indicating the bandwidth number of a to-be-scheduled bandwidth part. In addition, the parameter indication information is configured to indicate a configuration parameter used when the to-be-scheduled bandwidth part transmits data. In an embodiment, the parameter indication information may be a configuration parameter or a scrambling sequence for indicating the configuration parameter.

In addition, the scheduling signaling is sent by downlink control information (DCI). When the frequency-domain resource indication information includes the indication information of the frequency-domain transmission unit, since the DCI originally includes one information field for storing the indication information of the frequency-domain transmission unit, that is, a first information field in the DCI is configured to store the indication information of the frequency-domain transmission unit. At this time, in order to carry the parameter indication information in the DCI, when the parameter indication information is the configuration parameter, one information field, i.e., a second information field, may be defined in the DCI, and the second information field is configured to store the configuration parameter. When the parameter indication information is the scrambling sequence for indicating the configuration parameter, the scrambling sequence is carried on the DCI by scrambling. That is, the scrambling sequence may be scrambled on the DCI, thereby indicating the configuration parameter.

Further, when the frequency-domain resource indication information includes the indication information of the frequency-domain transmission unit and the bandwidth number indication information, in addition to the above information fields, one information field, i.e., a third information field, may be defined in the DO, and the third information field is configured to store the bandwidth number indication information.

The second information field is in a first preset location in the DCI and the second information field has a first preset length. The third information field is in a second preset location in the DCI and the third information field has a second preset length.

It should be noted that the lengths of the second information field and the third information field may each be a preset fixed bit length, or may be set according to practical situations. Specific lengths of the second information field and the third information field are related to the bandwidth numbers of the bandwidth parts configured on the terminal and the number of supported configuration parameters. For example, if the terminal supports four configuration parameters, the second information field for storing the parameter indication information in the DCI may have a length of two bits, such as "00", "01", "10", or "11".

In step 204, upon determining, based on the frequency-domain resource indication information and pre-stored configuration information, that the target bandwidth part is not the to-be-scheduled bandwidth part, the to-be-scheduled bandwidth part is determined from the plurality of bandwidth parts based on the frequency-domain resource indication information and the configuration information.

In the embodiment, the scheduling signaling sent by the base station on the target bandwidth part may be for the purpose of scheduling the target bandwidth part for data transmission. It may also be for the purpose of scheduling other bandwidth parts on the target bandwidth part for data transmission. Therefore, when the scheduling signaling sent by the base station on the target bandwidth part is received, it may be determined, based on the frequency-domain resource indication information in the scheduling signaling and the pre-stored configuration information, whether the target bandwidth part is the to-be-scheduled bandwidth part; and if the target bandwidth part is not the to-be-scheduled bandwidth part, the to-be-scheduled bandwidth part is determined from the plurality of bandwidth parts based on the frequency-domain resource indication information and the configuration information. For example, as shown in FIG. 2B, one carrier is configured with four bandwidth parts. The terminal may determine the to-be-scheduled bandwidth part from these four bandwidth parts based on the frequency-domain resource indication information and the pre-stored configuration information.

Since in the case where the numbers of the PRBs of the plurality of bandwidth parts are different from one another, the configuration information includes the frequency-domain locations, the set of supported configuration parameters, and the numbers of included PRBs of the plurality of bandwidth parts, the number of the PRB indicated by the frequency-domain resource indication information may be compared with the number of the PRB of the target bandwidth part, and if the numbers of the PRBs are the same, it is determined that the target bandwidth part is the to-be-scheduled bandwidth part; and if the numbers of the PRBs are different, it is determined that the target bandwidth part is not the to-be-scheduled bandwidth part. In the case where the target bandwidth part is not the to-be-scheduled bandwidth part, a bandwidth part, of which the number of the PRB is the same as the number of the PRB indicated by the frequency-domain resource indication information is selected from the plurality of bandwidth parts according to the configuration information, and the selected bandwidth parts is determined as the to-be-scheduled bandwidth part.

Similarly, since in the case where the PRBs of the plurality of bandwidth parts may have the same numbers, the configuration information includes the frequency-domain locations, the set of supported configuration parameters, the numbers of included PRBs of the plurality of bandwidth parts, and bandwidth numbers, the number of the PRB indicated by the frequency-domain resource indication information and the bandwidth number indicated by the bandwidth number indication information may be compared with the number of the PRB and the bandwidth number of the target bandwidth part respectively, and if the numbers of the PRBs are the same and the bandwidth numbers are the same, it is determined that the target bandwidth part is the to-be-scheduled bandwidth part; and if there is a difference, it is determined that the target bandwidth part is not the to-be-scheduled bandwidth part. In the case where the target bandwidth part is not the to-be-scheduled bandwidth part, a bandwidth part, of which the number of the PRB and the bandwidth number are the same as the number of the PRB indicated by the frequency-domain resource indication information and the bandwidth number indicated by the bandwidth number indication information, respectively, is selected front the plurality of bandwidth parts according to the configuration information, and the selected bandwidth parts is determined as the to-be-scheduled bandwidth part.

In step 205, data is transmitted through the to-be-scheduled bandwidth part according to a configuration parameter associated with the parameter indication information.

In the embodiment, the configuration information includes the set of configuration parameters supported by the plurality of bandwidth parts. That is, each bandwidth part may, support a plurality of configuration parameters, and the configuration parameter associated with the parameter indication information may be one of the plurality of configuration parameters. Therefore, after the to-be-scheduled bandwidth part is determined, data may be transmitted at the frequency-domain location of the to-be-scheduled bandwidth part according to the configuration parameter associated with the parameter indication information.

In addition, the parameter indication information may be a configuration parameter or a scrambling sequence for indicating the configuration parameter. Therefore, a corresponding configuration parameter may be acquired from a pre-stored correspondence between scrambling sequences and configuration parameters based on the scrambling sequence when the parameter indication information is the scrambling sequence, and then data may be transmitted at the frequency-domain location of the to-be-scheduled bandwidth part according to the acquired configuration parameter.

It should be noted that the correspondence between the scrambling sequences and the configuration parameters may be sent to the terminal by the base station through system signaling, RRC signaling, MAC signaling, or physical layer signaling. It may also be predefined, which is not limited in the embodiment of the present disclosure.

In the embodiment, in order to achieve multiplexing of a plurality of service types, the terminal flexibly supports cross-bandwidth part scheduling for data transmission. Since in the plurality of bandwidth parts, some bandwidth parts can transmit control information and some cannot transmit control information, the terminal receives the scheduling signaling sent by the base station on the target bandwidth part, wherein the scheduling signaling carries the frequency-domain resource indication information and the parameter indication information; and determines, based on the frequency-domain resource indication information and the pre-stored configuration information, whether the target bandwidth part is the to-be-scheduled bandwidth part. When the target bandwidth part is not the to-be-scheduled bandwidth part, the terminal may determine the to-be-scheduled bandwidth part from the plurality of bandwidth parts based on the frequency-domain resource indication information and the configuration information and then transmits data through the to-be-scheduled bandwidth part based on the configuration parameter associated with the parameter indication information. Thus, the other bandwidth parts are scheduled through the scheduling signaling transmitted on the target bandwidth part, thereby achieving cross-bandwidth part scheduling.

Figure 3A:
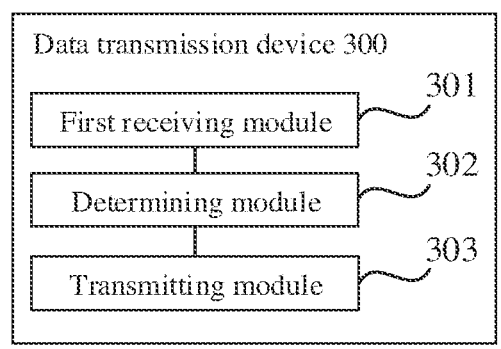
FIG. 3A is a block diagram of a data transmission device according to one exemplary embodiment.

FIG. 3 is a block diagram of a data transmission device 300 according to one exemplary embodiment. As shown in FIG. 3, the device 300 includes:

a first receiving module 301 configured to receive scheduling signaling sent by a base station on a target bandwidth part, wherein the scheduling signaling carries frequency-domain resource indication information and parameter indication information, and the target bandwidth part is a bandwidth part capable of transmitting the scheduling signaling in a plurality of configured bandwidth parts;

a determining module 302 configured to, upon determining, based on the frequency-domain resource indication information and pre-stored configuration information, that the target bandwidth part is not a to-be-scheduled bandwidth part, determine the to-be-scheduled bandwidth part from the plurality of bandwidth parts based on the frequency-domain resource indication information and the configuration information; and a transmitting module 303 configured to transmit data through the to-be-scheduled bandwidth part according to a configuration parameter associated with the parameter indication information.

In an embodiment, the parameter indication information includes a configuration parameter or a scrambling sequence for indicating the configuration parameter.

Figure 3B:
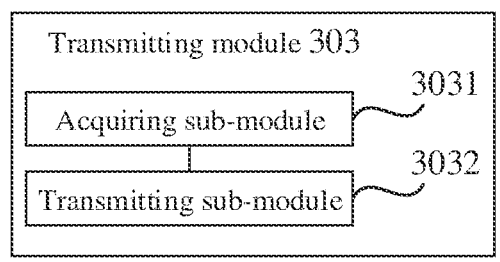
FIG. 3B is a block diagram of a data transmission device according to another exemplary embodiment.

In an embodiment, as shown in FIG. 3B, the transmitting module 303 includes:

an acquiring sub-module 3031 configured to acquire a corresponding configuration parameter from a pre-stored correspondence between scrambling sequences and configuration parameters based on the scrambling sequence when the parameter indication information is the scrambling sequence; and a transmitting sub-module 3032 configured to transmit data through the to-be-scheduled bandwidth part according to the acquired configuration parameter.

In an embodiment, the frequency-domain resource indication information includes indication information of a frequency-domain transmission unit, and the frequency-domain transmission unit includes one or more PRBs.

In an embodiment, the scheduling signaling is sent by downlink control information (DCI). The DCI includes a first information field for storing the indication information of the frequency-domain transmission unit. When the parameter indication information is the configuration parameter, the DCI further includes a second information field for storing the configuration parameter.

In an embodiment, the second information field is in a first preset location in the DCI, and the second information field has a first preset length.

In an embodiment, the scheduling signaling is sent by downlink control information (DCI). The DCI includes a first information field for storing the indication information of the frequency-domain transmission unit. When the parameter indication information is the scrambling sequence for indicating the configuration parameter, the scrambling sequence is carried on the DCI by scrambling.

In an embodiment, the frequency-domain resource indication information further includes bandwidth number indication information.

In an embodiment, the scheduling signaling is sent by downlink control information (DCI). The DCI includes a first information field for storing the indication information of the frequency-domain transmission unit and a third information field for storing the bandwidth number indication information. When the parameter indication information is the configuration parameter, the DCI further includes a second information field for storing the parameter indication information.

In an embodiment, the second information field is in a first preset location in the DCI, and the third information field is in a second preset location in the DCI. The second information field has a first preset length, and the third information field has a second preset length.

In an embodiment, the scheduling signaling is sent by downlink control information (DCI). The DCI includes a first information field for storing the indication information of the frequency-domain transmission unit and a third information field for storing the bandwidth number indication information. When the parameter indication information is the scrambling sequence for indicating the configuration parameter, the scrambling sequence is carried on the DCI by scrambling.

In an embodiment, the device 300 further includes:

a second receiving module configured to receive and store the configuration information sent by the base station, wherein the configuration information includes frequency-domain locations, a set of supported configuration parameters, and numbers of included PRBs of the plurality of bandwidth parts.

In an embodiment, the configuration information further includes bandwidth numbers of the plurality of bandwidth parts.

In an embodiment, the device further includes:

a third receiving module configured to receive triggering signaling sent by the base station, wherein the triggering signaling is configured to indicate that a cross-bandwidth part scheduling has been triggered.

In the embodiment, in order to achieve multiplexing of a plurality of service types, the terminal flexibly supports cross-bandwidth part scheduling for data transmission. Since in the plurality of bandwidth parts, some bandwidth parts can transmit control information and some bandwidth parts cannot transmit control information, the terminal receives the scheduling signaling sent by the base station on the target bandwidth part, wherein the scheduling signaling carries the frequency-domain resource indication information and the parameter indication information; and determines, based on the frequency-domain resource indication information and the pre-stored configuration information, whether the target bandwidth part is the to-be-scheduled bandwidth part. When the target bandwidth part is not the to-be-scheduled bandwidth part, the terminal needs to determine the to-be-scheduled bandwidth part from the plurality of bandwidth parts based on the frequency-domain resource indication information and the configuration information and then transmits data through the to-be-scheduled bandwidth part based on the configuration parameter associated with the parameter indication information. Thus, the other bandwidth parts are scheduled through the scheduling signaling transmitted on the target bandwidth part, thereby achieving cross-bandwidth part scheduling.

For the device in the above embodiment, the operations of each module have been described in details in the method embodiment and is not repeated here.

Figure 4:
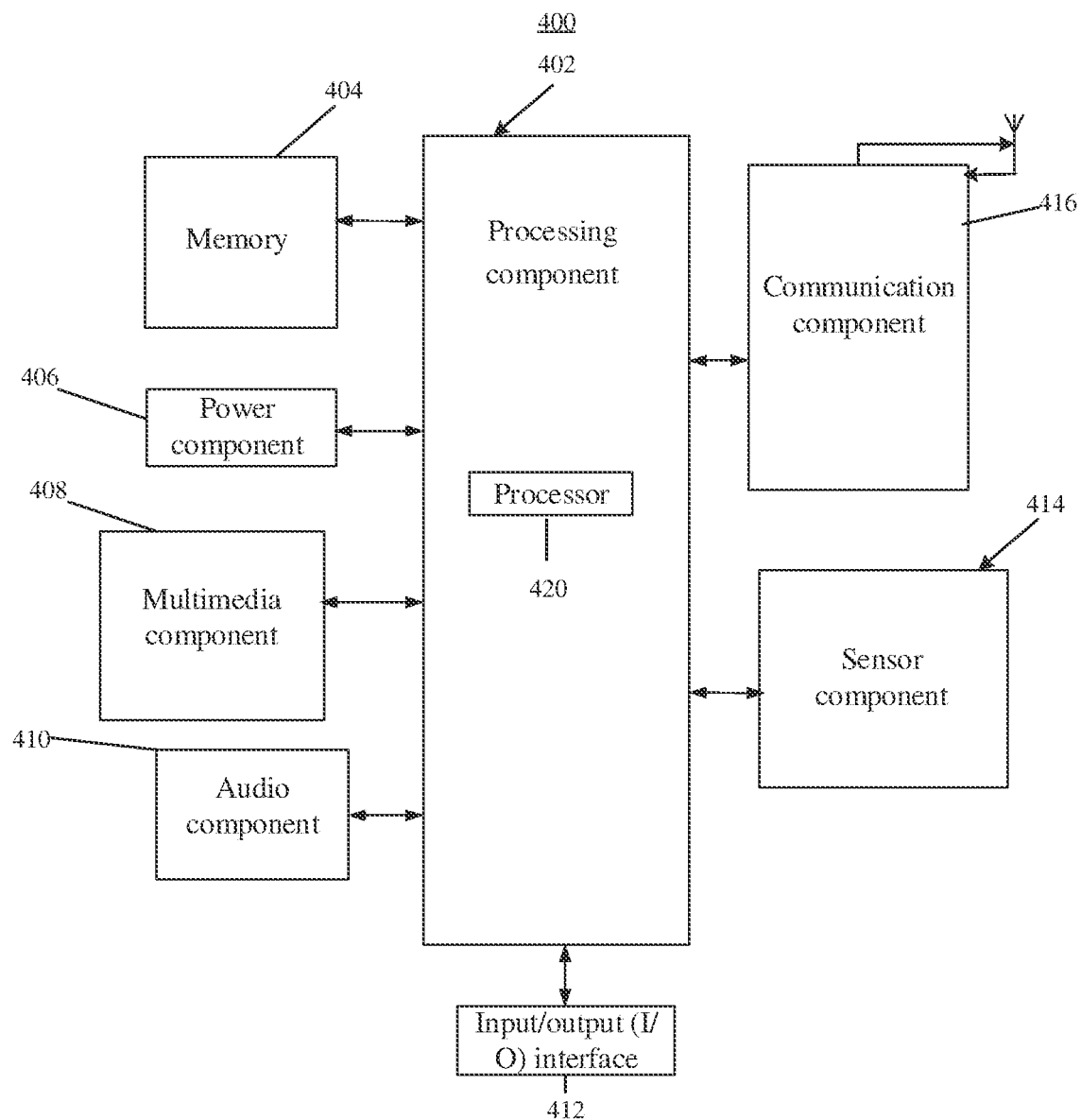
FIG. 4 is a block diagram of a data transmission device according to another exemplary embodiment.

FIG. 4 is a block diagram of a device 400 in accordance with an exemplary embodiment. For example, the device 400 may be a mobile phone, a computer, a digital broadcast terminal, a messaging device, a gaming console, a tablet device, a medical device, a fitness equipment, a personal digital assistant, and the like.

Referring to FIG. 4, the device 400 may include one or more of the following components: a processing component 402, a memory 404, a power component 406, a multimedia component 408, an audio component 410, an input/output (I/O) interface 412, a sensor component 414, and a communication component 416.

The processing component 402 typically controls the overall operations of the device 400, such as the operations associated with display, telephone calls, data communications, camera operations, and recording operations. The processing component 402 may include one or more processors 420 to execute instructions to perform all or part of the steps in the above described methods. Moreover, the processing component 402 may include one or more modules which facilitate the interaction between the processing component 402 and other components. For instance, the processing component 402 may include a multimedia module to facilitate the interaction between the multimedia component 408 and the processing component 402.

The memory 404 is configured to store various types of data to support the operation of the device 400. Examples of such data include instructions for any applications or methods operated on the device 400, contact data, phonebook data, messages, pictures, videos, etc. The memory 404 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROW, a read-only memory (ROM), a magnetic memory, a flash memory, a magnetic or optical disk.

The power component 406 provides power to various components of the device 400. The power component 406 may include a power management system, one or more power sources, and any other components associated with the generation, management, and distribution of power in the device 400.

The multimedia component 408 includes a screen providing an output interface between the device 400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 408 includes a front camera and/or a rear camera. The front camera and the rear camera may receive external multimedia data while the device 400 is in an operation mode, such as a photographing mode or a video mode. Each of the front camera and the rear camera may be a fixed optical lens system or have focus and optical zoom capability.

The audio component 410 is configured to output and/or input audio signals. For example, the audio component 410 includes a microphone (MIC) configured to receive external audio signals when the device 400 is in an operation mode, such as a call mode, a recording mode, and a voice recognition mode. The received audio signal may be further stored in the memory 404 or transmitted via the communication component 416. In some embodiments, the audio component 410 further includes a speaker for outputting audio signals.

The I/O interface 412 provides an interface between the processing component 402 and peripheral interface modules, such as a keyboard, a click wheel, buttons, and the like. The buttons may include, but are not limited to, a home button, a volume button, a start button, and a lock button.

The sensor component 414 includes one or more sensors to provide status assessments of various aspects of the device 400. For instance, the sensor component 414 may detect an on off status of the device 400, relative positioning of components, e.g., the display device and the mini keyboard of the device 400, and the sensor component 414 may also detect a position change of the device 400 or a component of the device 400, presence or absence of user contact with the device 400, orientation or acceleration/deceleration of the device 400, and temperature change of the device 400. The sensor component 414 may include a proximity sensor configured to detect the presence of nearby objects without any physical contact. The sensor component 414 may also include a light sensor, such as a CMOS or CCD image sensor, used for imaging applications. In some embodiments, the sensor component 414 may also include an accelerometer sensor, a gyroscope sensor, a magnetic sensor, a pressure sensor, or a temperature sensor.

The communication component 416 is configured to facilitate communication, wired or wirelessly, between the device 400 and other devices. The device 400 can access a wireless network based on a communication standard, such as Wi-Fi, 4G, or 5G, or a combination thereof. In an exemplary embodiment, the communication component 416 receives broadcast signals or broadcast associated information from an external broadcast management system via a broadcast channel. In an exemplary embodiment, the communication component 416 further includes a near field communication (NFC) module to facilitate short-range communications. In an exemplary embodiment, the communication component 416 may be implemented based on a radio frequency identification (RFID) technology, an infrared data association (IrDA) technology, an ultra-wideband (UWB) technology, a Bluetooth (BT) technology, and other technologies.

In exemplary embodiments, the device 400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, a non-transitory computer-readable storage medium including instructions is also provided, such as the memory 404 including instructions, executable by the processor 420 in the device 400, for performing the above-described methods. For example, the non-transitory computer-readable storage medium may be a ROM, a RAM, a CD-ROM, a magnetic tape, a floppy disc, an optical data storage device, and the like. When the instruction in the non-transitory computer-readable storage medium is executed by a processor of a mobile terminal, the mobile terminal may perform the above described methods.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure is only limited by the appended claims.

What is claimed is:

1. A data transmission method, comprising:
receiving scheduling signaling sent by a base station on a target bandwidth part, wherein the scheduling signaling carries frequency-domain resource indication information and parameter indication information, and the target bandwidth part is a bandwidth part capable of transmitting the scheduling signaling in a plurality of bandwidth parts, wherein the frequency-domain resource indication information carries indication information of a frequency-domain transmission unit, the frequency-domain transmission unit comprises one or more physical resource blocks (PRBs), and the frequency-domain resource indication information comprises bandwidth number indication information of a to-be-scheduled bandwidth part;
upon determining, based on the frequency-domain resource indication information and pre-stored configuration information, that the target bandwidth part is not a to-be-scheduled bandwidth part, determining the to-be-scheduled bandwidth part from the plurality of bandwidth parts based on the frequency-domain resource indication information and the configuration information; and
transmitting data through the to-be-scheduled bandwidth part according to a configuration parameter associated with the parameter indication information.

2. The method according to claim 1, wherein the parameter indication information includes at least one of the configuration parameter or a scrambling sequence for indicating the configuration parameter.

3. The method according to claim 2, wherein the parameter indication information is the scrambling sequence, and the transmitting data through the to-be-scheduled bandwidth part according to a configuration parameter associated with the parameter indication information comprises:
acquiring a corresponding configuration parameter from a pre-stored correspondence between scrambling sequences and configuration parameters based on the scrambling sequence; and
transmitting data through the to-be-scheduled bandwidth part according to the acquired configuration parameter.

4. The method according to claim 1, wherein:
the scheduling signaling is sent in by downlink control information (DCI), and the DCI comprises a first information field for storing the indication information of the frequency-domain transmission unit;
the parameter indication information is a configuration parameter; and
the DCI further comprises a second information field for storing the configuration parameter.

5. The method according to claim 4, wherein the second information field is in a first preset location in the DCI, and the second information field has a first preset length.

6. The method according to claim 1, wherein:
the scheduling signaling is sent by downlink control information (DCI), and the DCI comprises a first information field for storing the indication information of the frequency-domain transmission unit;
the parameter indication information is the scrambling sequence for indicating the configuration parameter; and
the scrambling sequence is carried on the DCI by scrambling.

7. The method according to claim 1, wherein the scheduling signaling is sent by downlink control information (DCI), and the DCI comprises a first information field for storing the indication information of the frequency-domain transmission unit and a third information field for storing the bandwidth number indication information.

8. The method according to claim 7, wherein the parameter indication information is the configuration parameter, and the DCI further comprises a second information field for storing the parameter indication information.

9. The method according to claim 8, wherein the second information field is in a first preset location in the DCI and the third information field is in a second preset location in the DCI; and the second information field has a first preset length, and the third information field has a second preset length.

10. The method according to claim 1, wherein the scheduling signaling is sent by downlink control information (DCI), and the DCI comprises a first information field for storing the indication information of the frequency-domain transmission unit and a third information domain for storing the bandwidth number indication information.

11. The method according to claim 10, wherein the parameter indication information is the scrambling sequence for indicating the configuration parameter, and the scrambling sequence is carried on the DCI by scrambling.

12. The method according to claim 1, wherein prior to the receiving scheduling signaling sent by a base station, the method further comprises:
receiving the configuration information sent by the base station, wherein the configuration information comprises frequency-domain locations, a set of supported configuration parameters, and numbers of included PRBs of the plurality of bandwidth parts.

13. The method according to claim 12, wherein the configuration information further comprises bandwidth numbers of the plurality of bandwidth parts.

14. The method according to claim 1, wherein prior to the receiving scheduling signaling sent by a base station, the method further comprises:
receiving triggering signaling sent by the base station, wherein the triggering signaling is configured to indicate that cross-bandwidth part scheduling has been triggered.

15. A data transmission device, comprising:
a processor; and
a memory for storing instructions executable by the processor,
wherein the processor is configured to
receive scheduling signaling sent by a base station on a target bandwidth part, wherein the scheduling signaling carries frequency-domain resource indication information and parameter indication information, and the target bandwidth part is a bandwidth part capable of transmitting the scheduling signaling in a plurality of bandwidth parts, wherein the frequency-domain resource indication information carries indication information of a frequency-domain transmission unit, the frequency-domain transmission unit comprises one or more physical resource blocks (PRBs), and the frequency-domain resource indication information comprises bandwidth number indication information of a to-be-scheduled bandwidth part;
upon determining, based on the frequency-domain resource indication information and pre-stored configuration information, that the target bandwidth part is not a to-be-scheduled bandwidth part, determine the to-be-scheduled bandwidth part from the plurality of bandwidth parts based on the frequency-domain resource indication information and the configuration information; and
transmit data through the to-be-scheduled bandwidth part according to a configuration parameter associated with the parameter indication information.

16. A data transmission method, applied to a base station, comprising:
sending scheduling signaling on a target bandwidth part to a terminal, wherein the scheduling signaling carries frequency-domain resource indication information and parameter indication information, and the target bandwidth part is a bandwidth part capable of transmitting the scheduling signaling in a plurality of bandwidth parts, wherein the frequency-domain resource indication information carries indication information of a frequency-domain transmission unit, the frequency-domain transmission unit comprises one or more physical resource blocks (PRBs), and the frequency-domain resource indication information comprises bandwidth number indication information of a to-be-scheduled bandwidth part, such that upon determining, based on the frequency-domain resource indication information and pre-stored configuration information, that the target bandwidth part is not a to-be-scheduled bandwidth part, the to-be-scheduled bandwidth part is determined from the plurality of bandwidth parts by the terminal based on the frequency-domain resource indication information and the configuration information, and data is transmitted by the terminal through the to-be-scheduled bandwidth part according to a configuration parameter associated with the parameter indication information; and
receiving the data from the terminal.

* * * * *